(12) United States Patent
Peloquin et al.

(10) Patent No.: US 11,591,100 B2
(45) Date of Patent: Feb. 28, 2023

(54) UNTETHERED ROBOT WITH HYBRID AIR AND WATER POWER FOR HOVERING AND QUICK AIRBORNE MOVEMENTS

(71) Applicant: Disney Enterprises, Inc., Burbank, CA (US)

(72) Inventors: Richard-Alexandre Peloquin, Glendale, CA (US); David Loyal Christensen, Glendale, CA (US); Morgan Thomas Pope, Burbank, CA (US); Grant Imahara, Los Angeles, CA (US); Tony Dohi, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/888,662

(22) Filed: Aug. 16, 2022

(65) Prior Publication Data

US 2022/0402624 A1 Dec. 22, 2022

Related U.S. Application Data

(62) Division of application No. 16/751,974, filed on Jan. 24, 2020, now Pat. No. 11,447,261.

(51) Int. Cl.
*B64D 31/06* (2006.01)
*B64C 39/02* (2006.01)
*B64D 27/02* (2006.01)

(52) U.S. Cl.
CPC ............ *B64D 31/06* (2013.01); *B64C 39/024* (2013.01); *B64D 27/02* (2013.01); *B64D 2027/026* (2013.01)

(58) Field of Classification Search
CPC ....... B64D 27/023; B63B 34/15; B63B 34/00; B63B 34/10; B64C 39/026; B64C 29/0083; B64C 27/006
See application file for complete search history.

(56) References Cited

U.S. PATENT DOCUMENTS 7,032,860 B1 * 4/2006 Kirk ..................... B64C 27/82
  244/17.15
7,104,499 B1 * 9/2006 Arata ..................... B64C 15/02
  244/12.3

(Continued)

OTHER PUBLICATIONS

David W. Way et al., Mars Science Laboratory: Entry, Descent, and Landing System Performance (2006) 2007 IEEE Aerospace Conference. NASA Langley Research Center. https://ieeexplore.ieee.org/abstract/document/4161337 (Year: 2006).*

*Primary Examiner* — Joshua J Michener
*Assistant Examiner* — Arfan Y. Sinaki
(74) *Attorney, Agent, or Firm* — Snell & Wilmer L.L.P.; Kent A. Lembke

(57) ABSTRACT

A robot including a hybrid fan-based and fluid-based propulsion system to provide thrust, such as deceleration during fall to create a smooth landing or to provide a quick reduction in velocity, and to provide actuation/controlled motion, such as to hover after quick deceleration and to control orientation or pose. The hybrid propulsion system uses discharging of pressurized fluid and exhausted gas (or fluid in some cases) from ducted fans (or propellers, impellers, and the like) to provide controlled thrust and/or lift forces. The hybrid propulsion system uses of pressurized fluid for generating larger or primary thrust and quick changes in velocity. The hybrid propulsion system includes a fan-based propulsion assembly with ducted fans that use environmental air (or fluids) to provide lower or secondary thrust. Both types of propulsion can be integrated into a robot or robotic figure to move the robot during flight (e.g., during falling or hovering).

19 Claims, 6 Drawing Sheets

(56) References Cited

U.S. PATENT DOCUMENTS

| | | | |
|---|---|---|---|
| 2006/0213710 A1* | 9/2006 | De Roche | A63H 27/12 |
| | | | 180/116 |
| 2008/0169375 A1* | 7/2008 | Ishikawa | F02C 3/107 |
| | | | 244/12.1 |
| 2017/0057635 A1* | 3/2017 | Strayer | B63G 3/04 |
| 2019/0375495 A1* | 12/2019 | Pfammatter | B64C 27/28 |
| 2020/0354054 A1* | 11/2020 | Badalassi | B64C 29/02 |

* cited by examiner

UNTETHERED ROBOT WITH HYBRID AIR AND WATER POWER FOR HOVERING AND QUICK AIRBORNE MOVEMENTS

CROSS-REFERENCE TO RELATED APPLICATIONS

This application claims the benefit of U.S. patent application Ser. No. 16/751,974, filed Jan. 24, 2020, which is incorporated herein by reference in its entirety.

BACKGROUND

1. Field of the Description

The present description relates, in general, to robots (or animatronic devices, as these terms may be used interchangeably herein) and control over movements or actuation of such robots while airborne and/or upon landing. More particularly, the present description relates to robots and robot control methods using thrust-based propulsion and/or actuation of a robot while airborne and/or during (and even after) landing in which the propulsion or power is provided by a hybrid system or combination of air and water (or liquid) power.

2. Relevant Background

Ground-based robots often are fixed in a single position or are mobile with wheels or tracks to roll on a surface or legs to walk about a space. However, robots that can fly through a space are more challenging as executing artistic movements such as quick deceleration and hovering to simulate theatrical rocket-like landing are difficult to control and actuate under the constant influence of gravity while at the same time emphasizing safety, cost effectiveness, and environmental friendliness. In-flight movements and stable or controlled landings for a flying robot have recently come into demand to provide unique and surprising entertainment to audiences in settings where it may be difficult to utilize live performers.

Jumping robots are one class of robots that implement aerobatic maneuvers after launching from the ground. Efforts at controlling a jumping robot's movements while launching and in the air have involved relatively complex robotic devices and controls designed to be able to successfully perform relatively simple jumps or similar movements. For example, some robots have been designed with a tail, and the tail is moved while the robot is in the air in an attempt to control the robot's specific orientation upon landing but without any other goals for control during flight. In another example, legged robots are controlled to move their legs during jumping again to control the singular pose or orientation of the robot when it lands. While useful in some applications, these robots lack the ability to generate thrust during flight and so have limited motion capabilities.

In other areas of research, flying machines such as drones and similar devices focus on aerodynamic flight that achieves position and motion control using motorized propulsion. Aerodynamic machines using relatively low thrust motors tend to provide smooth motion suitable for some types of animation but that are ill-suited for motions involving sudden acceleration. Other efforts have relied upon ballistic, ground-based propulsion with electric and inertia-controlled animation but without onboard thrust mechanisms for rapid deceleration to control forces experienced upon landing and without any ability to provide a stable, upright-type landing. Hence, there remains a need for new designs for robots to provide a dynamic range of thrust-actuated motion control that function alone and in conjunction with electric and inertia-based motion control during flight.

SUMMARY

To address the above and other needs, the inventors recognized that a new robot can be designed, built, and operated/controlled to maintain convincing character appearance and movement. The new robot is configured to use thrust-based propulsion and actuation during its flight such as before, during, and after flight created by dropping or releasing the robot at a significant height (e.g., 10 to 50 feet or greater drop heights) onto a landing surface. The new robot design includes a hybrid or combination air and liquid-based propulsion system to provide propulsion, such as deceleration during fall to create a smooth landing or to provide a quick reduction (or increase) in velocity, and to provide actuation/controlled motion, such as to hover after quick deceleration and to control orientation (angular position of body relative to a vertical axis) or pose (angular position of body relative to a horizontal axis).

Briefly, the hybrid propulsion system may use the discharging of air-pressurized water (or any gas-pressurized fluid) and exhausted air (or other gas or fluid such as if underwater) from ducted fans (which may include propellers, impellers, and the like) to provide controlled propulsion and/or actuation of the robot. The inventors understood that prior to their efforts that there had been very little to no exploration of using thrust-based propulsion in animatronics or robotics. The new hybrid propulsion system makes use of pressurized fluid (e.g., air-pressurized water in some preferred but non-limiting embodiments) for generating larger or primary thrust and quick changes in velocity as air-pressurized water has high thrust but low energy density. In this regard, the hybrid propulsion system includes a fluid-based propulsion assembly that is used for actions like launch or landing where the relatively heavy onboard reaction mass (e.g., the volume of liquid) can be ejected from the robot early in a flight plan (e.g., early in a show or display effect provided by the robot's operations). The hybrid propulsion system includes a fan-based propulsion assembly with ducted fans that use environmental air (or other fluid providing a reaction mass) to provide lower or secondary thrust with higher energy density at the cost of onboard energy storage (e.g., batteries to run fan motors). Both types of propulsion can be integrated into a robot or robotic figure to provide propulsion needed to move the robot, change directions during flight (e.g., during falling or hovering), and provide convincing poses and motion of the robot's body.

More particularly, a robot is provided that is configured for using hybrid fan-based and fluid-based (or rocket) propulsion during flight and landing. The robot includes a body (or frame) and a controller supported on the body. Significantly, the robot also includes a fluid-based propulsion assembly with a tank, mounted on the body, for storing a volume of pressurized fluid. The robot further includes a fan-based propulsion assembly mounted on the body with one or more fans arranged to apply lift forces on the body. During operations, the controller, when the robot is on a landing surface or is flying, falling, or hovering above a landing surface, generates a first control signal to cause the fluid-based propulsion assembly to discharge at least a portion of the volume of the pressurized fluid and generates a second control signal to operate at least one of the one or more fans of the fan-based propulsion assembly to apply the lift forces or secondary thrust on the body.

In some embodiments, the robot also includes an onboard distance sensor on the body, and the controller processes data collected by the onboard distance sensor to determine height of the robot above the landing surface and, in response, to generate the first and second control signals. In these or other embodiments, the fluid-based propulsion assembly further includes a fluid discharge system. This system includes a burst disc sealing an outlet aperture of the tank and a spring-loaded puncher released in response to the first control signal to cut or puncture the burst disc to allow the discharge of the volume of the pressurized fluid from the tank.

In some cases, the tank includes an outlet orifice at an end of the tank that is aligned with a central vertical axis of the body of the robot. The pressurized fluid may be water or another liquid pressurized by air or another gas. To control weight of the tank, the water may only be pressurized by the air to a pressure less than 150 PSI, while higher pressures may be used in other cases. The one or more fans of the fan-based propulsion assembly each may be a ducted fan (or propeller, impeller, or the like) supported on the body and arranged with an inlet facing in a direction opposite an outlet orifice of the tank and with a central axis parallel to a vertical axis of the body of the robot. The one or more fans of the fan-based propulsion assembly may include at least four ducted fans spaced equidistally apart and arranged about an outer circumference of the tank.

The fan-based propulsion (or secondary thrust) assembly further may include two or more ducted fans (or propellers, impellers, or the like) spaced apart on the body an offset distance apart from the one or more fans providing the lift forces or secondary thrust independently operable by the controller to apply motion control forces on the body. The two or more ducted fans may be each arranged on the body with a central axis transverse to the central vertical axis of the body of the robot. The robot may further include an onboard sensor for sensing at least one of pose and orientation of the body. The controller processes the sensed at least one of pose and orientation and, in response, generates control signals to selectively operate the two or more ducted fans to provide the motion control forces to modify the pose or the orientation of the body. In some cases, the two or more ducted fans providing the motion control forces are each of lower capacity than the one or more fans providing the lift forces. The offset distance is chosen to provide each of the two or more ducted fans with a greater lever arm relative to the center of mass (COM) of the robot than for the one or more fans providing the lift forces. Note, if two ducted fans are used it may be useful for these to be operated backwards and forwards. Three or four (or more) ducted fans may be useful with four or more providing redundancy and less control complexity.

DETAILED DESCRIPTION

There are many applications where it is desirable to provide untethered animatronics or robots (intended to mean nearly any object with motion in this description) that can have a wide range of controlled motion and flight or hovering capabilities. With this in mind, the inventors created a hybrid fan-based and fluid-based propulsion system that combines thrust provided by ducted fans on a robot body with thrust provided by discharge of pressurized fluid from an onboard storage tank (which may be any stored propellant such that the fluid-based propulsion system may be considered a rocket or rocket-based propulsion assembly) to achieve both quick changes in velocity and/or direction as well as fine-control motions such as an ability to hover above the ground. The term "fan-based" is intended to cover propellers, impellers, and the like, and the robot may be used underwater as well as in an open space (e.g., a gas-filled space).

The system uses a set of onboard and offboard sensors to determine a number of parameter values useful in controlling motions of the robot such as height, angular velocity, pose, orientation, and the like, and the onboard motion control system or controller triggers movements at particular points on the trajectory/flight path of the robot (such as after being dropped from a raised release mechanism). The movements are provided by triggering operations of the fluid-based propulsion assembly and/or by triggering operations of the fan-based propulsion assembly (e.g., to provide vertical thrust or lift to keep the robot above the ground and to provide control over side-to-side movements of the robot). The system further includes a landing assembly for absorbing forces generated upon impact of the robot with a landing surface upon which the robot lands at the end of its trajectory/flight path, and the landing assembly allows the robot to remain upright in many cases (e.g., to remain standing) and/or to bounce off the landing surface and then hover for a period of time.

Figure 1:
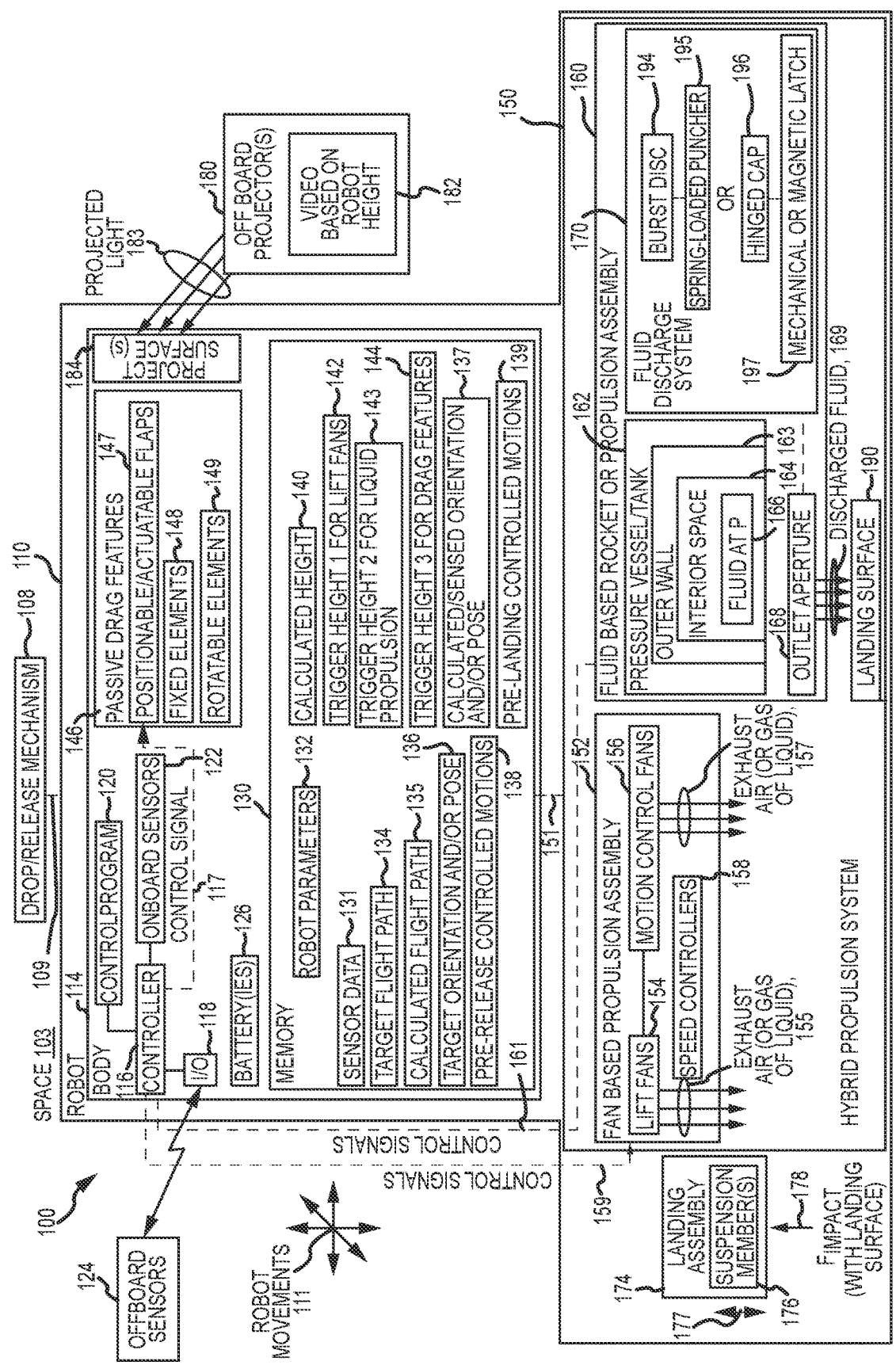
FIG. 1 is functional block diagram of a robot flight system according to the present description.

FIG. 1 is a functional block diagram of an exemplary robot flight system 100 that provides controlled movements or animation of a robot 110 during its flight (including falling, rising, rotating, skewing, spinning, hovering, and the like) through a space 103 (which may be a space filled with gas such as air or underwater so filled with water) along a flight path or trajectory until it lands on landing surface 190. Landing surface 190 may be the ground, wall, ceiling, or other environmental surface that robot 110 comes into contact or near contact with during its performance. In the system 100, the robot 110 is often untethered during its flight and movements 111, and the system 100 includes a drop and/or release mechanism 108 (but may also or instead include a launch mechanism) that is adapted to retain or support (as shown with dashed line 109) the robot 110 at some height, e.g., 10 to 50 feet or more above the landing surface 190, which may be the ground in a location where viewers can observe the flight/drop and also the landing and motions 111 during flight, upon landing, and after landing (e.g., a crowd of viewers at a theme park, at a sporting event, at a concert, and so on). The mechanism 108 can be actuated in response to a control signal (from a controller on the robot

110 such as controller 116 or system controller (not shown in FIG. 1)) to drop or launch (with ballistic and/or aerodynamic flight in some embodiments) the robot 110 on a launch trajectory or initial flight path to cause it to fly or fall through the space 103 and land on landing surface 190.

The mechanism 108 may take a wide variety of forms to practice the system such as a device such as a mechanical assembly for holding the robot 110 steady even in winds and for providing a quick release functionality. In other cases, the mechanism 108 does not simply drop or release the robot 110 but is configured for throwing, slinging, or catapulting the robot 110 toward the landing surface 190. The release may be in response to a control signal from the robot's controller 116 at a particular time in a show or display event or upon detection of a particular robot height 140 or from a system controller (not shown in FIG. 1) or a controller of the launch mechanism 108. The release height and/or other variables may be measured (such as with sensors 122 and/or 124) to choose when to release or otherwise launch the robot 110 and to determine timing for triggering operations of drag features 146 and portions of the hybrid propulsion system 150 to achieve desired robot movements 111 (e.g., deceleration, acceleration, and/or upward lift to achieve hovering and/or side-to-side motion) relative to the landing surface 190.

The robot 110 falls or flies along a trajectory at a velocity as shown with arrow 111. One feature of the system 100 described herein is that the flight velocity can be greater and the mass of robot 110 can be greater than if only propeller-based thrust were available to stop robot 110. Hight thrust from rocket mechanism 160 can reduce the speed of a falling robot 110 quickly before impacting the landing surface 190. The robot 110 has a body 114 (e.g., a torso, which may be a frame configured to have a humanoid form factor or a form factor of a desired character) optionally with one or more appendages moveable via actuators and joints (i.e., actuatable components 147 to vary drag and/or lift). The body 114 is configured to support one or more batteries 126 to provide power to components mounted on the body 114 including sensors, controllers, motors (e.g., for ducted fans 154, 156), and actuators for flaps 147.

The body 114 supports a controller 116 (e.g., one or more processors) that executes code or software to provide functions of a control program 120. Further, the controller 116 manages operations of input/output (I/O) devices 118 such as a wireless transceiver to communicate with an offboard controller of system 100 and/or with a set of offboard sensors 124 that operate to gather data on the robot 110 as it travels on its trajectory from the drop mechanism 108 to the landing surface 190. Further, onboard sensors 122 are provided to measure/sense additional data on the robot's travel and movements 111, and the combination of these sensor outputs is stored by the controller 116 in memory as sensor data 131 for processing by the control program 120 to facilitate in-flight control of motions/movements 111 of the robot 110.

Further, the robot 110 includes memory or data storage 130 whose access and operations are managed by the controller 116. The memory 130 is used to store data useful to the control program 120 for selectively controlling movements 111 of the robot 110 during flight, during landing, and during hovering above the surface 190 such as by operations of the hybrid propulsion system 150 and/or actuatable components 147 in the passive drag features assembly 146 and, specifically, by generating control signals 117, 151, 161 at specific times during flight of the robot 110. As shown, the memory 130 stores sensor data 131 from the onboard sensors 122 and optional offboard sensors 124. This data 131 may be processed to determine the robot's current height 140 and, in some cases, velocity. A set of robot parameters 132 may also be stored in memory 130 for use by the control program 120 in performing calculations such as the robot's weight and expected drag with its current configuration, which may be used to calculate a trajectory/flight path for the robot 110 upon release from drop/release mechanism 108. Each launch may not be perfect such that it may not provide a target trajectory/flight path 134 and the controller 116 may trigger motion control fans 156 and/or positionable/actuatable flaps 147 and/or choose timing of triggering of the fluid-based propulsion mechanism 160 based on a comparison of the target flight path 134 with the calculated flight path 135.

The memory 130 may be used to store a set of pre-release controlled motions 150 that may be used to set, via use of the motion control fans 156, the robot's pose and/or orientation 137 upon release/dropping to set an initial pose and orientation of the robot 110 during flight such as to adjust for wind or variances of the drop/release mechanism 108. A set of in-flight or pre-landing controlled motions 139 may also be provided in memory 130 or generated by the control program 120 for use by the control program 120 in initiating in-flight motions or movements to provide a desired pose and orientation 136 of the robot 110 at one or more points along the robot's trajectory (e.g., target or actual) and also (or instead) just prior to and/or at impact with the landing surface 190. This may be useful to adjust for changes in the pose or orientation during flight to achieve a desired landing pose such as to be vertical and land on its "feet" or to stick a landing. For example, the body 114 may be moved with a control strategy to lean into an angle of drop (caused by wind or other factors) so that result upon impact with the landing surface 190 is vertical or more vertical, and this movement 110 can be achieved with the motion control fans 156 in some cases.

As shown, the memory 130 is used to store a target pose(s) and target orientation(s) 136, which may be defined for the robot 110 at any point (or multiple points) along its target trajectory/flight path and, especially, upon landing on surface 190. Further, based on processing of the sensor data 131, the control program 120 may generate a sensed or calculated pose(s) and orientation(s) 137 at any point along the actual trajectory or fall to surface 190. The targeted and actual poses and orientations can be compared by the control program 120 and adjustments can be made, in some cases, with control signals to the motion control fans 156 and/or the actuatable components 147 (or with modifications to the pre-landing controlled motions 139).

In some embodiments, the sensors 122 include an inertial measurement unit (IMU) to provide velocity and/or acceleration data for the body 114 to help determine the present orientation 137. The IMU will not provide an absolute position for the body 114 (distance, angle, or the like) such that the sensors 122 preferably include one or more external-looking sensors to correct for these deficiencies of the IMU by providing data useful for determining the height 140 of the robot 110 and/or other parameters (e.g., current orientation and/or pose 137). The external-looking sensors may include LIDAR, laser, and/or ultrasound-based devices and/or single or multiple cameras facing the ground and/or the landing surface 190 (at least periodically during the flight on trajectories).

The controller 116 with program 120 may process the sensor data 131 to determine/calculate the present orientation and pose 137 of the robot's body 114 as well as the present height 140. All or a portion of the sensor data 131 and determined parameters are then used on a periodic (or nearly continuous) manner by the controller 116 and its program 120 to determine when the robot 110 is at heights 140 that match predetermined (or calculated) trigger heights such as a height 142 for triggering operations of lift fans 154, a height 143 for triggering operation of the fluid-based propulsion (or rocket) assembly 160, and a height(s) 144 for triggering actuation of passive drag features 147 to achieve a desired robot movement 111 and/or a target orientations and/or pose 136 and/or a target flight path 134.

Significantly, the robot 110 includes the hybrid propulsion system 150 to control the robot movements 110 including providing rapid movements such as vertical acceleration or deceleration and providing upward/vertical lift (parallel to the robot's vertical axis) and side-to-side or spin about the robot's vertical axis. As discussed earlier, the system 150 is "hybrid" in that it combines use of ducted fans provided in a fan-based propulsion system 152 with use of propulsion or thrust provided by quick release of pressurized liquid (such as water) from a fluid-based or rocket propulsion assembly 160. The propulsion system 150 is mounted as shown with dashed lines 151 to the robot body 114 such that the forces it generates by its operations are imparted upon the robot body 114.

The fluid-based propulsion assembly 160 includes a pressure vessel or storage tank 162 with an outer wall 163 (e.g., a steel wall defining a cylinder). The wall 163 defines an interior space 164 in which a volume of fluid (e.g., a liquid such as water) 166 at a desired pressure can be stored. Higher pressure may be used in some embodiments such as pressures over 150 PSI, with one tested robot 110 using water pressurized by air to 3000 psi. However, in some embodiments, it may be desirable to use lower pressure liquid 166 such as water pressurized by air to 150 PSI or below. The use of lower pressures allows a lighter weight tank 162 to be utilized so that after discharge of the liquid 166 the robot's weight is much lower than one using a high-pressure tank 162 of similar capacity. The capacity of the interior space 164 may be varied to practice the robot 110 with some embodiments using a tank 162 holding one to 10 gallons of water at about 150 PSI and one particular implementation using a tank 162 with a 5 gallon capacity of water pressurized by air to 150 PSI (or less), which provides about 35 pounds of liquid 166 in the assembly 160 upon drop or launch.

The tank 162 includes an outlet aperture 168 configured for quick and controlled discharge of the fluid 166 such as a 1 to 3-inch (or larger) diameter hole at a lower or bottom surface of the tank wall 163. A fluid discharge system 170 is provided in the propulsion assembly 160, and the system 170 is configured to provide a liquid-tight (or nearly so) seal of the aperture 168 until a control or trigger signal 151 is received by the assembly 160 from the controller 116. As shown, the seal may be provided with a burst disc 194 or a hinged cap 196, and the seal may be removed in response to the signal 151 with a spring-loaded puncher 195 acting on the burst disc 194 or a mechanical or magnetic latch 197 pivoting or moving the hinged cap 196 from the aperture 168. Then, the discharge system 170 operates to quickly open or unseal the outlet aperture 168 to allow the pressurized fluid or liquid 166 to rapidly discharge as shown at 169 to apply a thrust force upon the body 114.

In some embodiments, this is performed more than once during the movements 111 while in some preferred embodiments the fluid 166 is discharged all at one time to apply a large force upon the body 114 such as to provide rapid acceleration or deceleration (e.g., multiple Gs of deceleration in some test cases (e.g., 3 to 5 Gs or more)). In some cases, the liquid discharge system 170 is triggered by signal 151 when the robot 110 is only a short distance from the landing surface 190 such as with a trigger height 143 in the range of 3 to 10 feet, and this results in a dramatic effect as the discharged liquid 169 strikes the surface 190 with significant force causing a large amount of splashing. The effect can be caused to appear to include smoke and/or steam like a rocket landing by placing dry ice upon the landing surface 190. Once the tank 162 is emptied, the overall weight of the robot 110 is reduced by the weight of the fluid 166, which is useful as it now requires less lift to cause the robot 110 to fly or hover above the landing surface 190.

The fan-based propulsion assembly 152 includes one, two, three, four, or more ducted fans sized and positioned in the body 114 to act as lift fans 154. Particularly, the lift fans 154 are supported on body with their central axes parallel to a vertical axis of the body 114 (or at least at an angle of 45 degrees or less to this axis) so that their exhaust air 155 is output parallel to the body's vertical axis and, typically, in the same direction as the discharged liquid 169. This causes a lift force(s) to be applied to the body 114 causing the body 114 to decelerate when falling and also to move away from the landing surface to hover or fly (depending upon the amount of force generated and the weight of the body 114). In some embodiments, the lift fans 154 are configured to provide a lift force via exhaust air 155 that matches and, preferably, exceeds the force of gravity on the robot 114 so that the robot 110 is lifted away from the landing surface 190 after the discharge of the liquid 166 at least at higher fan speeds, with lower fan speeds providing ongoing hovering and/or controlled/gentle landing on surface 190. Fan speeds are set by speed controllers 158 (also for the motion control fans 156).

Operation of the lift fans 154 is controlled by the controller 116 via control signals 159 and is varied to provide the desired robot movements 111 and may be initially triggered, in some operational modes, when the robot 110 falls from a first or release height to a trigger height 142. In some embodiments, the lift fans 154 are positioned along the vertical axis of the body 114 so as to be proximate to the center of mass (COM) of the robot 110 or to have a relatively small lever arm so that the forces they apply to the body 114 mostly provide vertical lift and only smaller amounts of spin or side-to-side movements 111 (or forces that are offset by each other with pairs on opposite sides of a central vertical axis of the body 114).

The fan-based propulsion assembly 152 also includes ducted fans 156 (which may include propellers, impellers, and/or the like) that are sized and positioned on the body 114 to function as motion control fans 156 (which may also be propellers, impellers, and/or the like). In some embodiments, these fans 156 are sized so the forces they apply on the body 114 are less than those provided by lift fans 154. Further, the motion control fans 156 are positioned so the exhaust air 157 (or any gas in space 103 or a liquid in space 103 such as water) output by these fans 156 (center axis of fans 156) is transverse to the vertical axis of the body 114 with an orthogonal arrangement being preferred in some cases to apply forces that cause the robot body 114 to move 111 such as to spin about its vertical axis or to move its vertical axis away or toward vertical (e.g., to place the robot 110 in a more upright position after impact on the landing surface 190). The motion control fans 156, in this regard, may be positioned a greater distance from the COM of the robot 110 to have a larger lever arm than the lift fans 154 to facilitate the movements 111 with smaller forces achieved by fans 156 (e.g., an offset distance of 6 to 12 inches or more, with the offset to the center axis of the fans 156 from the body COM being in the range of 18 to 24 inches in one prototype).

Further, the robot 110 may include passive drag features 146 upon one or more exterior surfaces of the body 114 to achieve a desired motion 111 of the body 114 during flight. These passive drag features 145 may include one or more actuatable components 147 such as flaps that may be included on or as part of the body 114 that can be actuated in response to control signals 117 from the controller 116 to modify the motion/movement 111 of the robot 110 during system operations to better achieve more drag and/or to achieve a target pose or orientation 136 or to provide a particular acrobatic or stunt movement with the body 114. The features 146 may also include fixed drag inducing elements 148 and/or rotatable elements 149 (such as propellers, members that move out from the body and rotate due to air flowing over the body 114, and so on). In another example, a robot's body 114 may have one or more joints in features 146 that are operable via an actuator/drive mechanism to modify the shape/pose of the robot 110 (e.g., to cause the body to tuck and untuck), to change spin in one or more planes such as by sticking arms (or other appendages) out or pulling these in toward the torso of the body 114, or the like.

The robot 110 is also shown to include a landing assembly 174 attached to the body 114. The landing assembly 174 is configured to absorb the impact forces applied by the landing surface 190 upon the body 114 such as when the liquid-based propulsion assembly 160 and/or the lift fans 154 do not provide full deceleration or braking of the robot 114 such that the robot has a non-zero velocity when dropped by the mechanism 108 when it reaches the surface 190. To this end, the landing assembly 174 may include one, two, or more suspension or shock absorber members 176, and these may be configured to absorb the impact force, $F_{impact}$, applied to the body 114 as shown with arrow 178. The suspension members 176 may have features that are flexible or that provide some vertical movement 177 as part of this force absorption, e.g., a lower member that strikes the surface 190 at a first/lower end and that is supported for controlled movement that is resisted by a spring, by flexible material, or the like or the members 176 may simply be formed of a resilient material to absorb forces and to provide a bounce to the body 114 upon landing. In some cases, the members 176 may include disposable components that absorb energy through plastic deformation.

The robot 110 is shown to include a projection surface(s) 184 upon its body 114, which may take the form of outer surfaces of the body 114 and/or may take the form of an added element chosen for its projection qualities. The system 100 includes one or more offboard projectors 180 that are mounted so as to direct projected light 183 onto the projection surface(s) 184 during the fall of the robot 110 from the mechanism 108 and/or during movements 111. The offboard projector 180 is adapted to project video 182 such as a video 182 of a character who appears to be in or on the body 114 (or to be the body 114), and this video 182 is selected based on the height (e.g., the calculated height 140) of the robot 114. For example, the projected light 183 may generate an image of a certain height when the robot 110 is on or near the landing surface 190, which may be at a height matching or close to that of viewers. The video 182, in contrast, provide light 183 that generates an image of a differing (e.g., shorter) height when the robot is at a greater height off the landing surface, which provides foreshortening as expected by viewers viewing an object at a height above them. The amount of shortening or lengthening is controlled by the projector 180 and video 182 on an ongoing basis. The use of projected light 183 is also desirable for providing the effect that a character is in or on the robot 110 and/or to change the appearance of the robot 110 during falling, landing, and/or hovering/flight (movements 111). In some cases, the robot 110 may also include an onboard projector that can be operated to project on a translucent body shell 114 or translucent window/portion of the robot's body 114.

Figure 2:
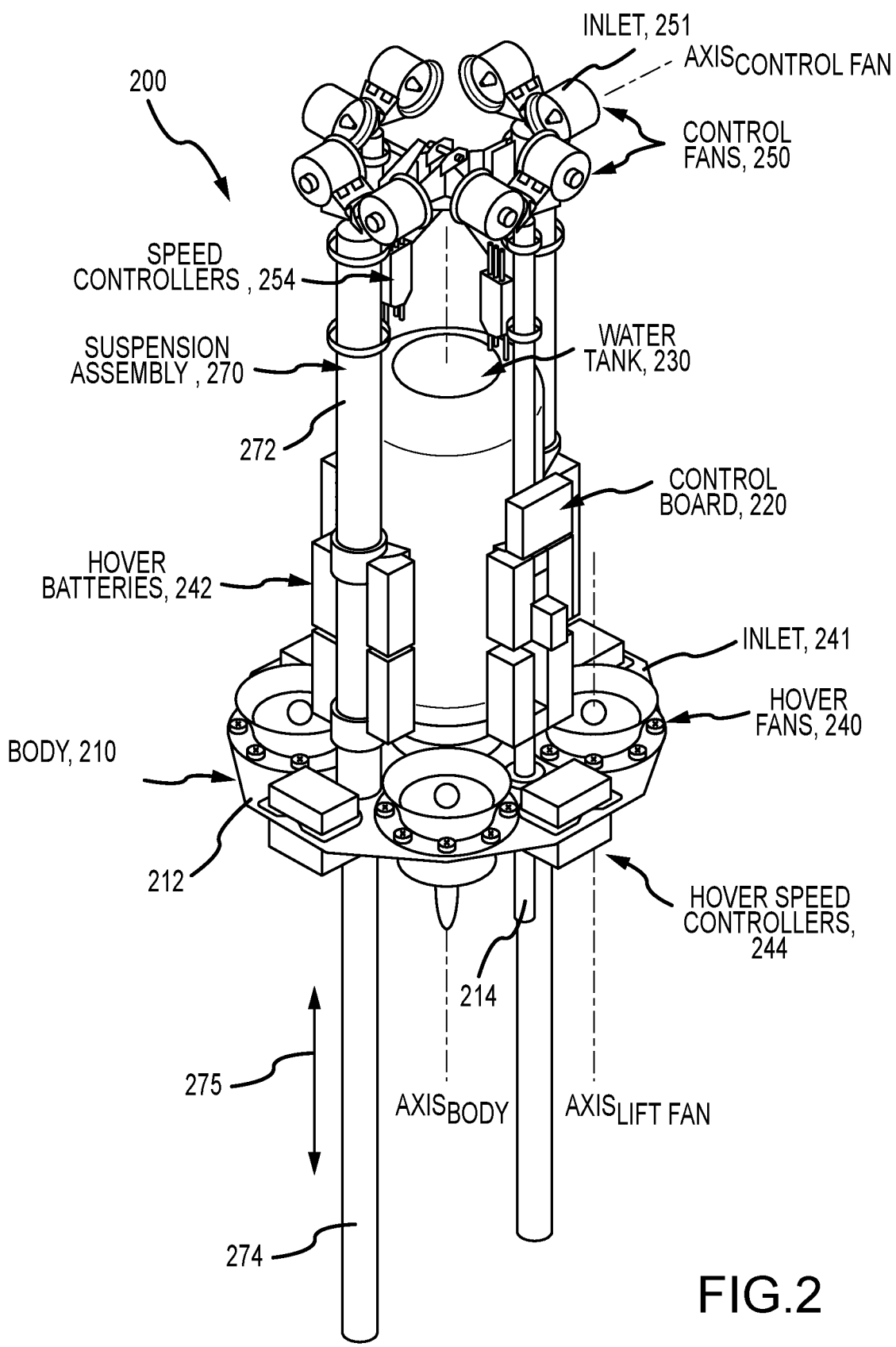
FIG. 2 is a top side perspective (or isometric) view of a robot with a hybrid propulsion system of the present description for use in the system of FIG. 1 and other environments.

With the hybrid propulsion system generally understood, it may now be useful to describe one useful implementation of a robot designed to effectively implement such fan-based and fluid-based (or rocket) hybrid propulsion to achieve controlled motions during untethered flight. FIG. 2 illustrates a top perspective view of a robot 200 with a hybrid propulsion system including a fan-based propulsion assembly and a fluid or rocket-based propulsion assembly. As shown, the robot 200 includes a body or support frame 210 that is configured to be relatively light while providing mounting points for the components of the hybrid propulsion system. Specifically, the body 210 includes a plate 212, which may be formed of a sheet of metal, hard plastic, or the like to be rigid. The plate 212 is arranged to be horizontal and typically orthogonal to the central vertical axis, $Axis_{Body}$, of the robot body 210, and the plate 212 may have an outer diameter defining the outer edges or sides of the body 210 chosen to be just large enough to contain all of the propulsion components. The body 210 further includes a pair of vertical struts 214 affixed to the plate 212 and extending upward parallel to the central vertical axis, $Axis_{Body}$, of the body 210 to provide support for a set of control fans 250 at an offset distance (e.g., 12 to 36 inches or more) from the plate 212 and lift or hover fans 240 mounted thereon, e.g., to provide a lever arm to allow smaller forces from these fans to provide movement of the body 210. The robot 200 further includes a control board 220 for implementing data processing, signal processing, and control signal generation functions of the robot 200 (e.g., the functions described above for the controller 116 and control program 120 of the robot 110 of FIG. 1).

The liquid-based propulsion assembly includes a cylindrical tank 230, which may be selected to contain lower pressure (150 PSI or less) water pressurized with air (or another gas) or to contain higher pressure water in some cases. The tank 230 is mounted to the support plate 212 of the robot body 210 with its central axis coinciding with the central vertical axis, $Axis_{Body}$, of the robot body 210 and with its outlet aperture (not shown in FIG. 2) also along these axes and below the support plate 212. This positioning of the tank 230 is not required but is desirable in many embodiments to position the heaviest (or one of the heaviest) components centrally and relatively low so as to place the COM at or just above the support plate 210 and on the axis, $Axis_{Body}$. The tank 230 may have a variety of sizes and shapes to implement the robot 200 with some prototypes and planned designs being configured for containing low pressure liquid (e.g., water) at capacities of 20 to 50 pounds or more. Other components of the liquid-based propulsion assembly are shown and described in more detail below with reference to later figures. As discussed above, the tank 230 is typically filled prior to initial operations of the robot 200 (such as a launch or drop) and then is discharged or emptied in one operation, which causes the robot 200 to become much lighter and more easy to maneuver with air-based propulsion (e.g., losses 20 to 50 pounds or more).

The air-based propulsion assembly is configured for concurrently or independently generating lift forces and motion control forces. To this end, four hover or lift fans 240 are provided that are mounted in the support plate 212 of the body 210 with their inlets 241 facing upward or toward top of the robot 200 so that exhausted air is directed downward to apply lift forces to the body 210. A speed controller 244 is provided (and rigidly mounted to the support plate 212) for each fan 240 and operates the fan motors to initiate fan operation and control their speeds based on control signals from the control board 220, and batteries 242 are also included and mounted to the vertical support struts 214. The hover fans 240 typically have a larger capacity (or propulsion capability) than the control fans 250, and the fans 240 are arranged with the central axis, $Axis_{Lift\ Fan}$, being parallel to the body's central vertical axis, $Axis_{Body}$, so that the forces the fans 240 generate are "upward" along the body 210 to cause it to hover (when the body 210 is arranged to be vertical) or to decelerate during a fall. Four fans 240 are shown that are equidistally placed about the circumference of the plate 212 to provide equal forces at 90-degree offsets (e.g., the fans are of equal size), but a smaller or larger number may be used in some embodiments.

The air-based propulsion assembly also includes motion control fans 250 supported on ends of the struts 214 (and, as shown, the upper suspension legs or housings 272). Speed controllers 254 (which may also provide battery power) are also mounted near these fans 250 and control the speed of the fan motors in response to control signals from the control board 220 to initiate operation. The control fans 250 may be operated in adjacent pairs in this embodiment, but this is not a requirement as larger fans may be used instead.

As noted, the control fans 250 are typically much smaller (and lighter) than the hover fans 240 (e.g., 50 to 25 percent the capacity or less), but placing them at a large offset from the support plate 212 and/or COM of the robot 200 allows the smaller propulsion forces to more readily move the body 210 such as with spin about the vertical axis, $Axis_{Body}$, and/or with tilt to change pose. Four pairs of fans 250 are shown to provide control forces at 90-degree offsets about the $Axis_{Body}$, but fewer or greater numbers (e.g., 2, 3, 5, 6, or more fans 250) may be used to achieve more gross or more fine control over movements of the robot 200, to provide redundancy, or the like (but fewer may use backward and forward operated fans and may require increased control complexity than four fans). Also, the location of the control fans 250 may be varied such as by including one or more lower in the body 210. The fans 250 are shown to be arranged to have their inlets 251 facing inward and to have the central fan axis, $Axis_{Control\ Fan}$, transverse to and more typically orthogonal to the central vertical axis, $Axis_{Body}$, of the robot 200, as this provides propulsion in directions not provided by lift fans 240 (e.g., propulsion forces transverse or orthogonal to those of fans 240).

The robot 200 further includes a suspension assembly 270 configured to absorb shock and/or impact forces imparted upon the robot 200 during landing on a landing surface. In the illustrated embodiment, the suspension assembly 270 includes a pair of spaced apart suspension legs or shock absorbers each with an upper housing or leg member 272 rigidly attached to the body's support plate 212 and extending a distance above the plate 212. The upper housing 272 may be formed as a tube with an inner diameter defining an inner chamber for receiving a lower leg member 274. The lower leg member 274 may have feet or lower ends extending outward a distance from the plate 212 and upper ends slidingly supported within the upper housing or leg member 272. When the lower ends of the lower leg members 274 have an impact force applied to them, the lower leg members 274 are pushed upward into the upper housing or leg member 272 as shown with arrow 275, and a spring, a volume of resilient material, or the like may be provided in the inner chamber of the upper housing or leg member 272 to resist this movement and absorb the impact forces and to push the leg 274 back out when impact forces are no longer applied as shown with arrow 275. The suspension legs of assembly 270 are shown to be elongate with axes extending parallel to the central vertical axis, $Axis_{Body}$, of the robot 200, and two legs are shown but one to four or more may be used in some implementations. The legs of assembly 270 may take other forms to practice the robot 200 and do not necessarily need to push back after landing.

Figure 3:
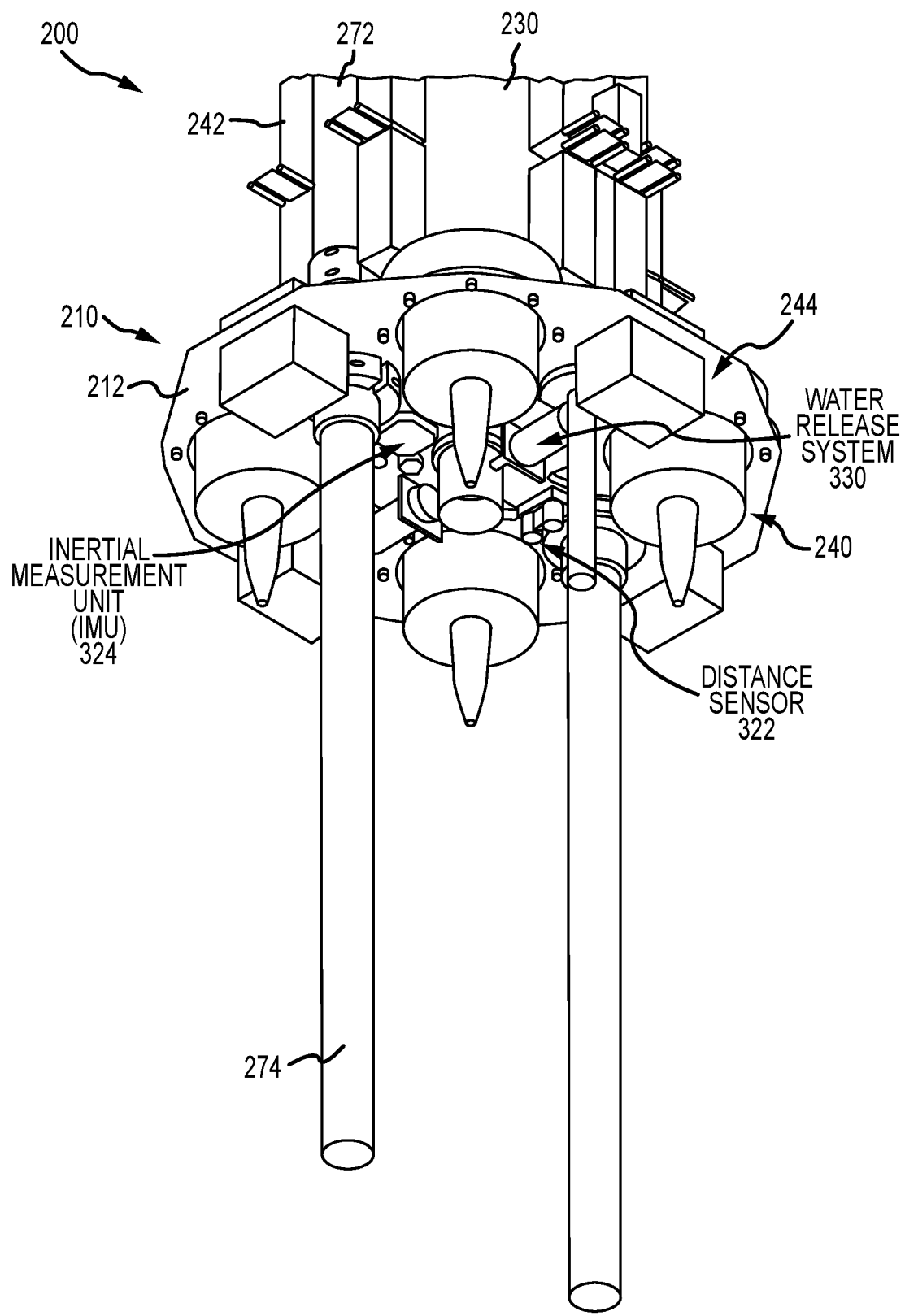
FIG. 3 provides a bottom perspective or underside view of the robot of FIG. 2.

FIG. 3 illustrates an underside view of the robot 200. This view is useful for showing the water release system 330 of the liquid-based propulsion assembly that is configured to, in response to a control signal from the control board 220, open an outlet aperture of the tank 230 and discharge the contained pressurized liquid. The outlet aperture of the tank 230 extends through the support plate 212 of the body 210, and the water release system 330 is rigidly attached to the plate 212 to selectively seal and open this aperture.

FIG. 3 also shows onboard sensors of the robot 200 that are used to determine its pose and orientation and its present height, with the sensor data being processed by the control board 220 as discussed above with reference to FIG. 1. Particularly, the onboard sensors include a distance sensor 322 mounted on the lower surface of the plate 212 and facing downward (when the robot 200 is arranged vertically). The output from the sensor 322 is processed to determine the distance to the ground or other landing surface (i.e., the present height of the robot 200). In this regard, the distance sensor 322 may take the form of a LIDAR device or the like, the height determinations are used by the control board 220 in generating control signals to operate the water release system 330 and the hover fans 240. Further, the onboard sensors include an inertial measurement unit (IMU) 324 whose output is processed to determine the orientation and/or pose of the robot 200 (and/or movements of the robot 200) during flight/hovering and landing. This information is used by the control board 220 in generating signals to operate the control fans 250. Those skilled in the arts will understand that these exemplary sensors may be replaced with other sensors and/or be supplemented by additional types of sensors to implement the robot 200.

Figure 4:
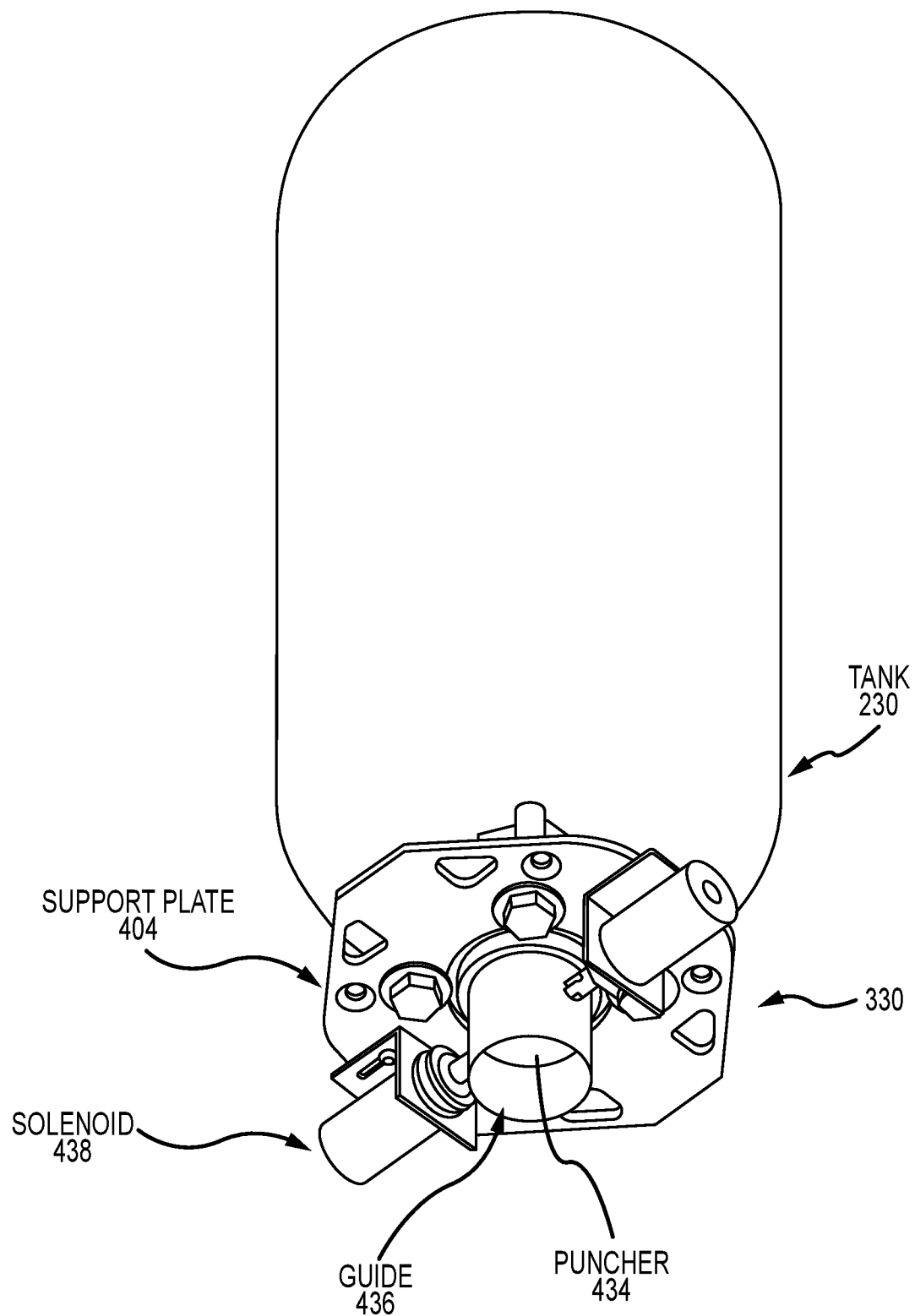
FIG. 4 is a bottom perspective view of the tank and water release system of the robot of FIG. 3.
Figure 5:
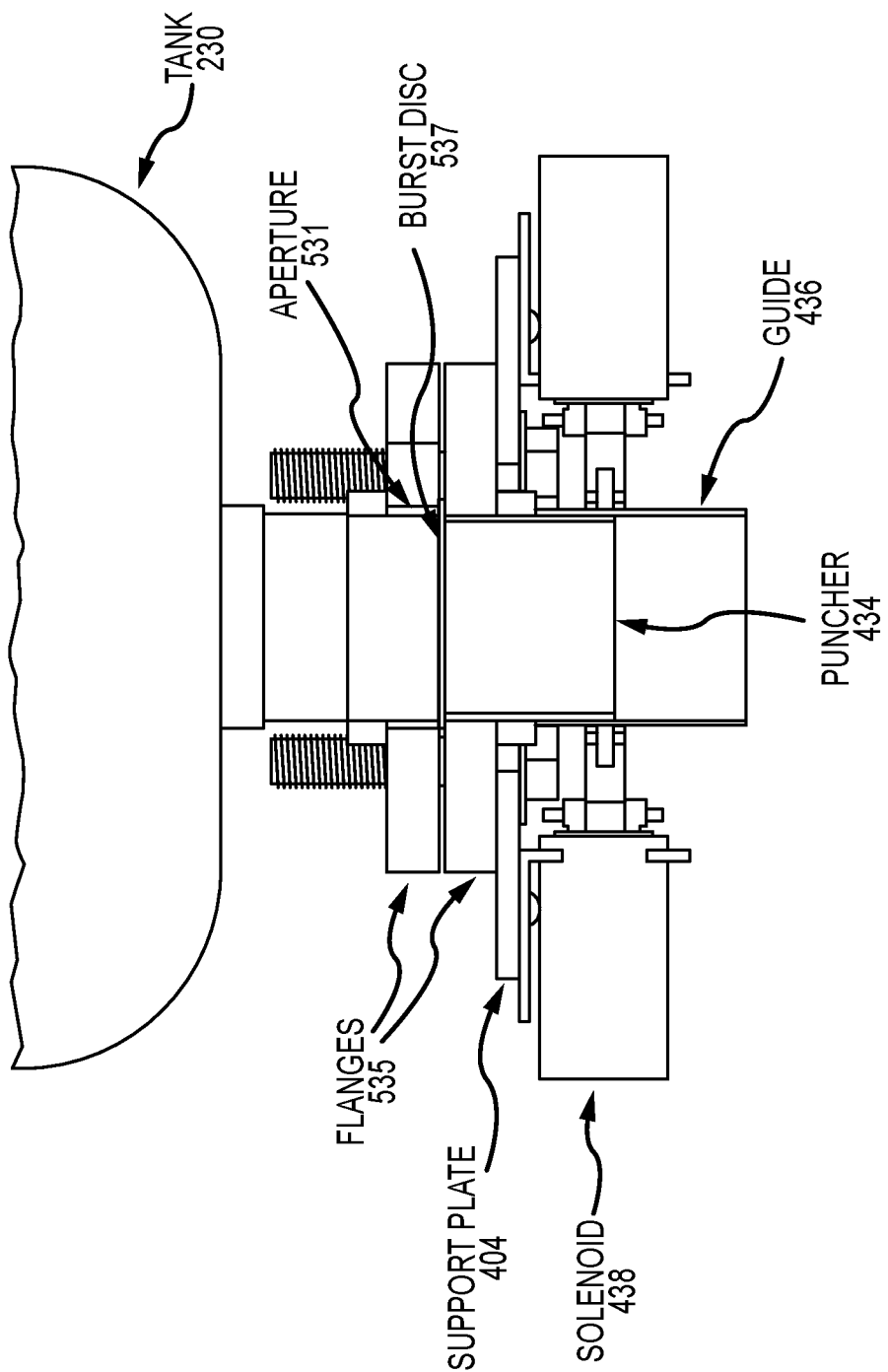
FIG. 5 is a side sectional view of the tank and water release system of FIG. 4.

FIG. 4 is a bottom perspective view of the tank and water release system of the robot of FIG. 3, and FIG. 5 is a side sectional view of the tank and water release system of FIG. 4. A variety of mechanisms can be used to implement a liquid discharge system to achieve the function of providing a liquid-tight seal of the pressurized tank 230 and quick release of the volume of pressurized liquid. For example, a conventional valve arrangement may be used such as a ball valve operated by a solenoid or the like, but it may useful to reduce the weight by implementing a rupture or burst disc arrangement (e.g., a ball valve may weigh 5 or more pounds and a rupture disc arrangement may be implemented at a fraction of this weight).

In FIGS. 4 and 5 (with reference to FIG. 3), the water release system 330 is attached to the body plate 212 with a discharge support plate 404. A pair of flanges 535 are used to affix a burst disc 537 to the outlet aperture 531 of the tank 230, and the burst disc 537 is chosen to be able to withstand the pressures created in the tank 230 (e.g., a rating over 150 PSI in a low-pressure application). Upon filling and charging the tank 230, the flanges 535 and burst disc 537 provide a liquid-tight seal.

To selectively puncture or break the burst disc 537 and generate water-based propulsion, the system 330 includes a puncher 434 which is a spring-loaded device placed within a cylindrical guide 436 with a sharp outer edge spaced apart from the outer surface of the disc 537. A pair of solenoids 438 are provided on the plate 404 and configured to retain the puncher 434 in the spring-loaded, space-apart position or state until a trigger or control signal is received from the control board 220. Upon triggering, the solenoids 538 release the puncher 434 (e.g., a circular saw blade on its tip/upper end), which slides up into contact with the outer perimeter of the disc 537 with enough force so as to burst the disc 537.

As a result, the pressurized liquid in the tank 230 explosively and quickly moves the material of the burst or broken (or cut) disc 537 and exits out the outlet aperture 531 and guide 436 (which has a larger diameter than the aperture 531). The water (or other liquid) and air used to pressurize it exit the water release system 330 in a column through the puncher guide 436 and then rapidly expand out into a much larger diameter jet, which typically strikes the landing surface and creates a large spray, but some embodiments may create a jet that retains an outer diameter of the outlet orifice (or nearly matching the orifice OD). This provides a significant propulsion force (e.g., multiple Gs) that are applied to the body via the robot body 210, to which the tank 230 and water release system 330 are rigidly attached.

In some embodiments, it may be desirable to alter the appearance of the robot as it falls, lands, and/or hovers such as to disguise the presence of the hybrid propulsion system, to make the robot take on the appearance of a character or object from literature or videos, and/or to create the impression to observers that a favorite character or object is in or on the robot. It is desirable for such projected images to vary with the height of the robot off the ground or above the viewers to match human expectations.

Figure 6B:
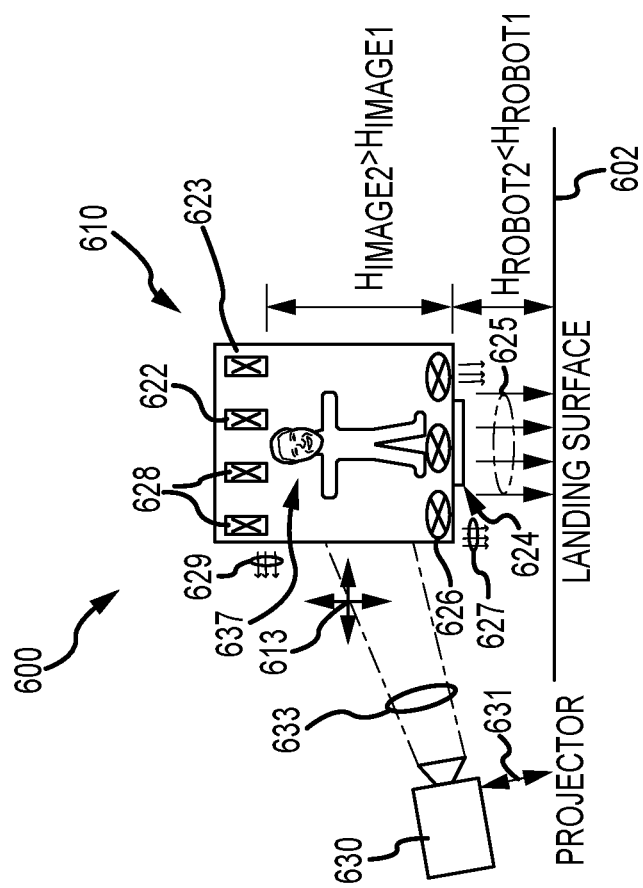
FIGS. 6A and 6B illustrate schematically two operating states for a robot flight system of the present description making use of external projectors to obtain unique visual effects in combination with a hybrid propulsion system.
Figure 6A:
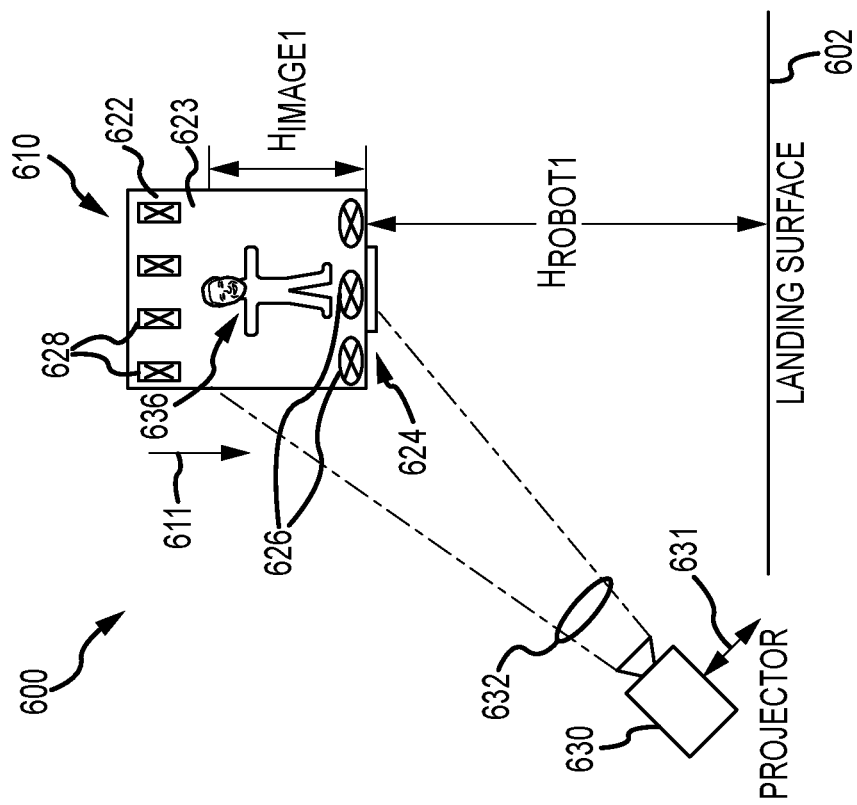

To this end, FIGS. 6A and 6B illustrate a robot flight system 600 during two operating states. In a first state of FIG. 6A, a robot 610 with a body 622 is at a first relatively large height, $H_{Robot\ 1}$, which may be the case at or soon after release of the robot from a drop mechanism. The robot 610 includes liquid-based propulsion assembly 624 that is not operating (e.g., pressurized water is stored in an onboard tank) and an air-based propulsion assembly with lift/hover fans 626 and motion control fans 628 that are also not yet being operated. As a result, the robot 610, which is untethered, is in freefall toward a landing surface 602.

With the robot 610 at this relatively large height, $H_{Robot\ 1}$, a projector 630, which is operating to track the robot's fall/vertical movement 611, is operated to project light 632 onto an outer projection surface 623 on the robot body 622, and this generates a first image 636 (e.g., of a superhero, a movie character, or the like) with a first height, $H_{Image\ 1}$, suited to the height and viewing angle for observers on or near the landing surface 602. The image 636 is foreshortened in many cases.

In FIG. 6B, the system 600 is shown at a second operating state in which the robot 610 has fallen to a point where it is only a small distance, $H_{Robot\ 2}$, above the landing surface 602. To provide a smoother landing and/or to initiate hovering with controlled movement, the liquid-propulsion assembly 624 is operating to discharge pressurized liquid 625, which applies a relatively large and quick deceleration or upward lift force upon the robot body 622. Concurrently, in this example, the lift/hover fans 626 are being operated to exhaust air 627 downward to also provide an upward vertical lift or propulsion force upon the robot body 622, which may cause the robot 610 to hover or even rise (movements indicated with arrows 613) above the landing surface 602 upon the ejection of all the liquid 625. Further, one or more of the motion control fans 628 are operating to exhaust air 629 and apply control forces upon the body 622 causing it to move transverse to the robot's vertical axis and/or to spin about this axis.

Concurrently, the projector 630 is projecting light 633 onto the projection surface 623 of the body 622 causing a second image 637 to be displayed. The light 633 is chosen to suit the height, $H_{Robot\ 2}$, of the robot 610 that is much smaller than the previous or first height, $H_{Robot\ 1}$. Particularly, the image 637 has a second height, $H_{Image\ 2}$, that is much greater than the first height, $H_{Image\ 1}$, as would be expected if an object or character were actually on or in the robot 610 during its flight. The projector 630 may be moved (or its image changed) to track the varying heights of the robot 610 during its movements 611 and 613 as shown by arrow 631.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The control processes for the robot and its hybrid propulsion system may be varied to implement the robot. For example, the motion control fans may be operated and speed controlled to provide thrusts to try to keep the body level during change of direction (e.g., during hovering in windy conditions). The control program may also include strategies for operating the propulsion components to account for a loss of primary power to ensure the robot is oriented in a way that will maximize the likelihood of surviving impact. For example, if a robot/craft were to lose a thrust fan, the control program may be configured to compensate for tilt with full power of the appropriate control fans and reduce the opposite thrust fan just to the point of not tipping to get maximum thrust without tipping over and maximum deceleration on the way down to the ground/landing surface. In the same or other cases, the control program may operate to release the gas (air) pressure quickly so that the tank lands without a pressurized system. Also, multiple control fans are typically provided for some level of redundancy if one or more is lost.

The liquid discharge system described above used a burst disc to cover the tank outlet orifice/aperture (e.g., a 2-inch opening in the tank or the like) and used a spring-loaded circular blade or puncher to quickly cut through and allow flow out of the tank. In other cases, a point or points on spring-loaded elements may be used to rupture the seal. In other implementations, the discharge system may include one or more heating elements that can be operated to heat the burst disc to reduce its strength causing it to rupture from the force applied by the liquid with or without a cutting or piercing element striking its outer surface. The discharge system may instead include a mechanical cap over the aperture that can be moved or pivoted away with a quick release device (triggered by a control signal from the controller). In other cases, a magnetic release is used to move a cap over the tank outlet aperture or orifice to release the pressurized water in a rapid manner. In each case, the seal device and outlet guide are larger in diameter than the outlet aperture so that the discharge of liquid is not hindered or throttled by the discharge system. One may also add pressure to the tank so that a burst disk ruptures. For example, if the rupture disk is rated for 150 psi, the robot may be initially pressurized with 20 psi or other amount of pressurized liquid for safety. Then, when all systems have proven to be performing as expected and the software (control program or the like) approves engagement of the liquid rocket, the tank may be pressurized to 140 psi (or some pressure below 150 psi) and, on the final signal to fire, the software may add pressure to the tank (e.g., try to add 20 psi or the like) to exceed the burst pressure of 150 psi to rupture the disk.

Some embodiments include motors or other devices in the liquid tank or vessel to make the liquid settle to the bottom of the tank even during fall or flight. This is desirable to make sure that the liquid is rapidly ejected rather than merely frothing liquid or air only. In other cases, the tank may include a bladder or balloon in its interior chamber to surround water and separate liquid from pressurizing gas and cause the water to be forced out by the air. In some cases, internal baffles are used to obtain better discharge of the pressurized liquid. Also, while the examples above stress the use of pressurized liquid such as water pressurized by air, some embodiments of the hybrid propulsion system may make use of pressurized gas in the tank with no liquid (e.g., compressed air or the like for providing rapid deceleration). In other cases, self-pressurization is achieved through heating and/or a chemical reaction.

The robot may further include onboard lights to add color to the discharged water and created mists/splash. Similarly, chemicals may be provided in the liquid that flame upon exposure to the atmosphere during discharge to create exciting show effects. In cases where the robot includes limbs that can be animated or selectively moved, the controller may operate these limbs during falling, hovering, and/or landing to provide dynamic control of the robot's movements and/or to enhance balance in the vertical state.

While external projection was highlighted in the above examples, the inventors have also created prototype designs utilizing internal projection (e.g., with an onboard projector and internal projection surfaces that may be rear projection elements, be translucent portions of the body or its shell, or the like). For example, an effect may be created that creates the appearance of a character piloting the robot/craft. This effect may be executed with a projector mounted inside the robot/craft body that is operated to project onto a rear-projection screen (which has a front surface visible from the exterior of the robot/craft's body such as by viewers below the flying robot/craft).

We claim:

1. A method of operating a robot with hybrid fan and fluid-based propulsion, comprising:
   storing a volume of pressurized fluid in a tank mounted on a body of the robot;
   releasing or launching the robot from or to a height above a landing surface;
   after the releasing or launching, triggering release of at least a portion of the volume of the pressurized fluid from an outlet of the tank and toward the landing surface to apply primary thrust to the body; and
   operating one or more ducted fans on the body of the robot to apply secondary thrust to the body to lift the body away from the landing surface.

2. The method of claim 1, wherein the secondary thrust is of a magnitude and direction that the robot hovers a distance above the landing surface after the triggering step.

3. The method of claim 1, wherein the one or more ducted fans are operated to vary the secondary thrust during the operating step.

4. The method of claim 1, further comprising operating an additional one or more ducted fans on the body of the robot to apply additional fan-based thrust to the body in two or more directions transverse to a vertical axis of the body to control pose, orientation, or motion of the body while the robot hovers above the landing surface.

5. The method of claim 1, further comprising sensing a height of the body above the landing surface and when the sensed height of the body is at or below a predefined deceleration trigger height, performing the triggering of the release of the volume of the pressurized fluid.

6. The method of claim 5, further comprising projecting light corresponding to a video or still image onto a projection surface the body of the robot, wherein a height or size of the video or still image varies based on the sensed height of the body.

7. The method of claim 1, further comprising actuating one or more drag elements on an exterior surface of the body to modify the drag of the body during flight or actuating one or more actuatable limbs on the body to provide dynamic control of motion of the robot during flight.

8. A method of operating a robot with hybrid fan and fluid-based propulsion, comprising:
   storing a volume of pressurized fluid in a tank mounted on a body of the robot;
   releasing or launching the robot from or to a height above a landing surface;
   after the releasing or launching, triggering release of at least a portion of the volume of the pressurized fluid from an outlet of the tank and toward the landing surface to apply primary thrust to the body;
   operating one or more fans on the body of the robot to apply secondary thrust to the body to lift the body away from the landing surface; and
   operating an additional one or more fans on the body of the robot to apply additional fan-based thrust to the body in two or more directions transverse to a vertical axis of the body to control pose, orientation, or motion of the body after the releasing or launching.

9. The method of claim 8, wherein the secondary thrust is of a magnitude and direction that the robot hovers a distance above the landing surface after the triggering step.

10. The method of claim 8, wherein the one or more fans are operated to vary the secondary thrust during the operating step.

11. The method of claim 8, further comprising sensing a height of the body above the landing surface and when the sensed height of the body is at or below a predefined deceleration trigger height, performing the triggering of the release of the volume of the pressurized fluid.

12. The method of claim 11, further comprising projecting light corresponding to a video or still image onto a projection surface the body of the robot, wherein a height or size of the video or still image varies based on the sensed height of the body.

13. The method of claim 8, further comprising actuating one or more drag elements on an exterior surface of the body to modify the drag of the body during flight or actuating one or more actuatable limbs on the body to provide dynamic control of motion of the robot during flight.

14. A method of operating a robot with hybrid fan and fluid-based propulsion, comprising:
   storing a volume of pressurized fluid in a tank mounted on a body of the robot;

releasing or launching the robot from or to a height above a landing surface;

triggering release of at least a portion of the volume of the pressurized fluid from an outlet of the tank and toward the landing surface to apply a first thrust to the body;

operating one or more ducted fans on the body of the robot to apply a second thrust to the body to lift the body away from the landing surface; and actuating one or more drag elements on an exterior surface of the body to modify drag of the body during flight or actuating one or more actuatable limbs on the body to provide dynamic control of motion of the robot during flight.

15. The method of claim 14, wherein the second thrust is of a magnitude and direction that the robot hovers a distance above the landing surface after the triggering step.

16. The method of claim 14, wherein the one or more ducted fans are operated to vary the second thrust during the operating step.

17. The method of claim 14, further comprising operating an additional one or more ducted fans on the body of the robot to apply additional fan-based thrust to the body in two or more directions transverse to a vertical axis of the body to control pose, orientation, or motion of the body while the robot hovers above the landing surface.

18. The method of claim 14, further comprising sensing a height of the body above the landing surface and when the sensed height of the body is at or below a predefined deceleration trigger height, performing the triggering of the release of the volume of the pressurized fluid.

19. The method of claim 18, further comprising projecting light corresponding to a video or still image onto a projection surface the body of the robot, wherein a height or size of the video or still image varies based on the sensed height of the body.

* * * * *